United States Patent Office 3,453,342
Patented July 1, 1969

3,453,342
METHOD OF MAKING 9-METHYLOCTAHYDRO-ANTHRACENE AND 9-METHYLOCTAHYDRO PHENANTHRENE
Ronald D. Bushick, Glen Mills, Pa., assignor to Sun Oil Company, Philadelphia, Pa., a corporation of New Jersey
No Drawing. Filed Dec. 14, 1967, Ser. No. 690,417
Int. Cl. C07c 15/28, 15/30, 3/62
U.S. Cl. 260—668                         6 Claims

ABSTRACT OF THE DISCLOSURE 9-methyloctahydroanthracene and/or 9-methyloctahydrophenanthrene are formed by the disproportionation of methyl-1,2,3,4-tetrahydronaphthalene the methyl group of the latter compound being on the aromatic ring. The disproportionation is carried out in the presence of HF—$BF_3$ and at a temperature of 35–80° C.

---

This invention relates to a method of forming 9-methyl-sym-octahydroanthracene (herein 9-methyl OHA) and 9-methyl-sym-octahydrophenanthrene (herein 9-methyl OHP). These compounds are formed by the disproportionation of 5-methyl-1,2,3,4-tetrahydronaphthalene or 6-methyl-1,2,3,4-tetrahydronaphthalene in the presence of liquid HF and $BF_3$.

In United States Patent 3,336,407 I have disclosed that under certain conditions 1,2,3,4-tetrahydronaphthalene disproportionates to form OHA and OHP. I have now found that a methyl substituted 1,2,3,4-tetrahydronaphthalene wherein the methyl group is on the aromatic ring disproportionates to form 9-methyl OHA and 9-methyl OHP. For example:

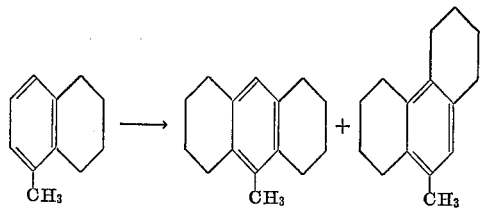

Surprisingly an analogous reaction does not occur with a methyl substituted 1,2,3,4-tetrahydronaphthalene wherein the methyl group is on the saturated ring. For example, with 1-methyl-1,2,3,4-tetrahydronaphthalene much hydrogen dismutation occurs resulting in various substituted naphthalenes and di-hydronaphthalenes with no octahydrotricyclic products being formed.

9-methyl OHA and 9-methyl OHP are useful in that they can be converted to pyromellitic and mellophanic anhydride by known techniques, these anhydrides being well known as suitable monomers in the preparation of polyimides. For example 9-methyl OHA is converted to benzenepentacarboxylic acid by treatment with 50% $HNO_3$ at 180° C. and this acid is converted to pyromellitic anhydride by heating to 270–300° C. 9-methyl OHP is converted to mellophanic anhydride in an analogous manner.

As described above 9-methyl OHA and 9-methyl OHP are formed by the disproportionation of 5- or 6-methyl-1,2,3,4-tetrahydronaphthalene in the presence of HF and $BF_3$. In describing the invention in more detail it will be assumed that the starting material is 5-methyl-1,2,3,4-tetrahydronaphthalene.

The HF should be employed in liquid phase. Although the reaction is carried out above the boiling point of HF (19.4° C.) the pressure in the reaction vessel should be sufficient to maintain the HF in liquid phase. All boiling points herein are at 760 mm. Hg absolute pressure unless otherwise stated. Normally the $BF_3$ (B.P.=—101° C.) pressure in the reaction vessel is sufficient to maintain the HF in liquid phase. If not, other convenient means can be employed to insure the use of liquid HF, such as pressuring the reaction vessel with nitrogen, etc. The amount of HF employed should be at least 1 mole per mole of 5-methyl-1,2,3,4-tetrahydronaphthalene but is preferably at least 5 moles, more preferably at least 10 moles per mole of 5-methyl-1,2,3,4-tetrahydronaphthalene. Preferably the HF:5-methyl-1,2,3,4-tetrahydronaphthalene mole ratio does not exceed about 50:1, although ratios as high as 200:1 or even higher can be used if desired.

The amount of $BF_3$ used should be at least 0.1 mole per mole of 5-methyl-1,2,3,4-tetrahydronaphthalene and is preferably at least 0.5 mole per mole of 5-methyl-1,2,3,4-tetrahydronaphthalene. The amount of $BF_3$ used will normally not exceed 2 moles per mole of 5-methyl-1,2,3,4-tetrahydronaphthalene although amounts as high as 10 moles per mole of 5-methyl-1,2,3,4-tetrahydronaphthalene or even higher, e.g., 100 moles per mole of 5-methyl-1,2,3,4-tetrahydronaphthalene can be used if desired.

The temperature at which the disproportionation is carried out should be 35–80° C. Although the temperature is preferably 40–70° C., more preferably 40–60° C., the reaction temperature is inter-related with the reaction time and the effect of a change in reaction temperature can often be nullified by an equivalent change in reaction time. The reaction time can vary considerably but a substantial amount of reaction occurs almost immediately, i.e., within 1–2 minutes, with additional reaction occurring thereafter at a slower rate. In most cases the reaction time will be at least 30–60 minutes and in most cases will not exceed 3–5 hours.

The reaction can be carried out in any convenient manner using equipment of conventional type. For example, the 5-methyl-1,2,3,4-tetrahydronaphthalene starting material is charged to a closed reaction vessel equipped with heating and agitation means. If desired a solvent such as heptane can be employed but this is not essential. The required amount of HF is then added following which the HF-5-methyl-1,2,3,4-tetrahydronaphthalene mixture is heated to the desired reaction temperature. Next the desired amount of $BF_3$ is added and the vessel is then preferably shaken or the contents thereof otherwise agitated in order to insure efficient contact of the HF—$BF_3$ catalyst with the 5-methyl-1,2,3,4-tetrahydronaphthalene. After adding the $BF_3$ the reaction mass is then maintained at the reaction temperature for the desired reaction time.

At the end of the reaction period the reaction vessel contains HF, $BF_3$ 9-methyl OHA and/or 9-methyl OHP, some unreacted 5-methyl-1,2,3,4-tetrahydronaphthalene, and some by products such as 6-methyl-1,2,3,4-tetrahydronaphthalene, OHA, etc. Merely opening the vessel will effect the removal of most of the HF and $BF_3$ since the reaction is carried out above their boiling points. Any remaining HF and any $BF_3$ dissolved therein can be distilled from the vessel. The 9-methyl OHA and 9-methyl OHP can be separated from the other organic materials by means described hereinafter.

If it is desired to remove the HF as a liquid rather than as a gas the reaction vessel is cooled to below 19.4° C. at the end of the reaction time. The vessel is then opened, which effects removal of most of the $BF_3$ and the remaining reaction mass is quenched in ice water. Two liquid layers result, an aqueous acid layer and an organic layer. If desired, the acid in this two-phase system can be neutralized by mixing the system with Na₂CO₃. The organic layer is then decanted and is preferably washed with water several times to remove any remaining traces of acid or any traces of Na₂CO₃. Dilution of the organic layer with a solvent such as pentane facilitates the decanting step.

The 9-methyl OHA and 9-methyl OHP can be recovered from the organic layer in any convenient manner, such as by chromatographic techniques or by distillation. 9-methyl OHP boils at 176–178° C. at 12 mm. Hg and 9-methyl OHA boils at 165–170° C. at 12 mm. Hg.

The 5- or 6-methyl-1,2,3,4-tetrahydronaphthalene starting material can be readily obtained by known methods, such as by hydrogeneration of the corresponding naphthalene over a Raney nickel catalyst.

The table below shows the results of four examples. In each example the reaction vessel is a small reactor equipped with an external shaker and heating and cooling means. The reactor is flushed out with nitrogen and is then evacuated. The amount of 6-methyl-1,2,3,4-tetrahydronaphthalene charged is about 0.1 mole and is the same in all runs. The reactor is shaken, heated to the desired reaction temperature, and the BF₃ is then added. In all runs the BF₃ pressure is sufficient to maintain essentially all of the HF in liquid phase. The reactor is then held at the reaction temperature for the desired reaction time, the time being measured from the time of BF₃ addition. Shaking of the reactor continues throughout the entire reaction time. At the end of the reaction period the reactor is cooled to 20° C., opened, and the contents thereof quenched in ice. Two liquid layers result, an aqueous acid layer and an organic layer. This two-phase system is neutralized with Na₂CO₃ after which the organic layer is drawn off and washed several times with twice its volume of water. The organic layer is then analyzed by vapor phase chromatography which also effects the separation of 9-methyl OHA and 9-methyl OHP from themselves and from other components of the reaction product mixture.

TABLE

| Run No. | Time, min. | Temp., °C. | HF starting material, mole ratio | BF₃ starting material, mole ratio | Weight percentage 9-methyl OHA and OHP reaction product |
|---|---|---|---|---|---|
| 467572-1 | 60 | 50 | 9.25:1 | 0.51:1 | 12.0 |
| 467573 | 180 | 50 | 10.20:1 | 0.64:1 | 25.6 |
| 467589-1 | 180 | 50 | 9.30:1 | 0.45:1 | 24.3 |
| 411280 | 90 | 50 | 9.50:1 | 0.57:1 | 13.2 |

The stated amount of 9-methyl OHA and 9-methyl OHP is based upon the total reaction product weight, the reaction product being all materials remaining after removal of the HF and BF₃. The exact amount of 9-methyl OHA and the exact amount of 9-methyl OHP are not determined, but nuclear magnetic resonance indicates that the ratio of 9-methyl OHP to 9-methyl OHA is about 2:1. Thus in Runs 411280 and 467489–1 nuclear magnetic resonance shows that the amount of 9-methyl OHP is about 69% and 66% respectively whereas the amount of 9-methyl OHA is about 31% and 34% respectively. These percentages are based on the total weight of these two products.

What is claimed is:

1. Method comprising contacting a material having the formula

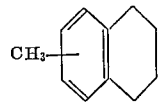

with HF and BF₃ at a temperature of 35–80° C., the amounts of HF and BF₃ being at least 1 mole and 0.1 mole respectively per mole of said material, for a time sufficient to effect disproportionation of said material, and recovering 9-methyloctahydroanthracene or 9-methyloctahydrophenanthrene from the reaction product mixture.

2. Method according to claim 1 wherein said material is 5-methyl-1,2,3,4-tetrahydronaphthalene.

3. Method according to claim 1 wherein said material is 6-methyl-1,2,3,4-tetrahydronaphthalene.

4. Method according to claim 1 wherein said temperature is 40–70° C.

5. Method according to claim 1 wherein the amount of HF is at least 5 moles per mole of said material.

6. Method according to claim 1 wherein the amount of BF₃ is at least 0.5 mole per mole of said material.

References Cited
UNITED STATES PATENTS 3,336,407  8/1967  Bushick _____ 260—668

DELBERT E. GANTZ, *Primary Examiner.*

CURTIS R. DAVIS, *Assistant Examiner.*